(12) United States Patent
Hassani et al.

(10) Patent No.: US 9,725,116 B2
(45) Date of Patent: Aug. 8, 2017

(54) VEHICLE AND VEHICLE PARKING SYSTEM

(71) Applicant: FORD GLOBAL TECHNOLOGIES, LLC, Dearborn, MI (US)

(72) Inventors: Ali Hassani, Ann Arbor, MI (US); Adil Nizam Siddiqui, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/670,994

(22) Filed: Mar. 27, 2015

(65) Prior Publication Data

US 2016/0280268 A1    Sep. 29, 2016

(51) Int. Cl.

| | | |
|---|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |
| B62D 15/02 | (2006.01) |
| B60W 10/04 | (2006.01) |
| B60W 10/18 | (2012.01) |
| B60W 10/20 | (2006.01) |

(52) U.S. Cl.
CPC ......... *B62D 15/0285* (2013.01); *B60W 10/04* (2013.01); *B60W 10/18* (2013.01); *B60W 10/20* (2013.01); *B62D 15/027* (2013.01); *B60W 2420/42* (2013.01); *B60W 2550/10* (2013.01); *B60W 2710/06* (2013.01); *B60W 2710/18* (2013.01); *B60W 2710/20* (2013.01); *B60W 2750/30* (2013.01)

(58) Field of Classification Search
CPC ...... B62D 5/0463; B62D 7/159; B62D 6/008; B62D 6/003; B60T 8/1755
USPC .......................................................... 701/41
See application file for complete search history.

(56) References Cited

U.S. PATENT DOCUMENTS

| | | |
|---|---|---|
| 3,069,654 A | 12/1962 | Hough |
| 8,289,189 B2 | 10/2012 | Becker et al. |
| 2008/0140286 A1 | 6/2008 | Jung |

(Continued)

OTHER PUBLICATIONS

3D Computer Vision II, Reminder Camera Models, by Nassir Navab (based on a course given at UNC, by Mark Pollefeys & ); Computer Aided Medical Procedures, Technische Universitat Munchen; Oct. 21, 2010; 46 Pages.

(Continued)

*Primary Examiner* — Maceeh Anwari
(74) *Attorney, Agent, or Firm* — Frank MacKenzie; Brooks Kushman P.C.

(57) ABSTRACT

A vehicle is provided. The vehicle includes a camera configured to detect a target object in a parking space and a controller programmed to advance the vehicle into the parking space based on a yaw angle of the vehicle and a distance to the target object in response to the camera detecting the presence of the target object. The distance to the target object is based on a vector representing a boundary of the target object.

20 Claims, 3 Drawing Sheets

(56) References Cited

U.S. PATENT DOCUMENTS

2010/0066515 A1* 3/2010 Shimazaki ............ B60W 50/14
340/435
2014/0300707 A1 10/2014 Viaene et al.

OTHER PUBLICATIONS

Dissecting the Camera Matrix, part 2: The Extrinsic Matrix; A Computer Vision Blog, Stightations (http://ksimek.github.io/2012/08/22/extrinsic/); Mar. 16, 2015, 7 Pages.

Use of the Hough Transformation to Detect Lines and Curves in Pictures, by Richard O Duda and Peter E. Hart, Stanford research Institute. Menlo Park, California (Communications of the ACM [Association of Commuting Machinery]); Graphics and Image Processing, W. Newman, Editor; Jan. 1972 Issue, pp. 11-15.

In-Depth Discussion—NI Vision Jun. 2011 Concepts Help—National Instruments, (http://zone.ni.com/reference); web page dated Mar. 12, 2015, 6 Pages.

Machine Vision, by Ramesh Jain, Rangachar Kasturi, and Brian G. Schunck Published by McGraw-Hill, Inc., ISBN 0-07-032018-7, 1995, 549 Pages (pp. 309-364).

Measuring Distances Using Digital Cameras, Australian Senior Mathematics Journal, vol. 21 Issue 2, pp. 24-28, (2007) by Dave Kendal, University of Melbourne; 64 Pages.

EECS 351-1: Introduction to Computer Graphics, Building a Virtual Camera, (https://canvas.northwestern.edu/courses/9782/files/815138/download); 10 Pages.

Geometric Camera Parameters, Course at University of Nevada, (http://www.cse.unr.edu/~bebis/CS791E/Notes/CameraParameters.pdf); 9 pages.

Robotics 2, Camera Calibration, by Barbara Frank, Cyrill Stachniss, Giorgio Grisetti, Kai Arras, and Wolfram Burgard; University of Freiburg class, (http://ais.informatik.uni-freiburg.de/teaching/ws10/robotics2/pdfs/rob2-10-camera-calibration.pdf); 42 pages.

A Guided Tour of Computer Vision, by Vishvjit S. Nalwa, Feb. 1, 1993; pp. 34-40.

A Guided Tour of Computer Vision, by Vishvjit S. Nalwa, Feb. 1, 1993; pp. 123-137.

Introductory Techniques for 3-D Computer Vision, by Emanuele Trucco, and Alessandro Verri, (ISBN-13: 978-0132611084); Mar. 16, 1998, pp. 31-48.

* cited by examiner

VEHICLE AND VEHICLE PARKING SYSTEM

TECHNICAL FIELD

The present disclosure relates to vehicles and methods of parking vehicles.

BACKGROUND

A vehicle may include an automated parking system that is capable of parking the vehicle independent of driver input from manual controls (e.g., steering wheel, accelerator pedal, brake pedal, etc.).

SUMMARY

A method of parking a vehicle is provided. The method includes detecting a target object in a parking space with a camera, and advancing the vehicle into the parking space based on an angle between the target object and a perpendicular of a camera field of vision, and a distance from the camera to the target object. The distance from the camera to the target object is based on a vector representing a boundary of the target object.

A vehicle is provided. The vehicle includes a camera configured to detect a target object in a parking space and a controller programmed to advance the vehicle into the parking space based on a yaw angle of the vehicle and a distance to the target object in response to the camera detecting the presence of the target object. The distance to the target object is based on a vector representing a boundary of the target object.

A vehicle is provided. The vehicle includes a camera configured to output a signal indicating the presence of a target object in a parking space and a controller that is in communication with the camera. The controller is programmed to advance the vehicle into the parking space based on a an angle between the target object and a perpendicular of a camera field of vision and a distance from the camera to the target object in response to receiving the signal from the camera indicating the presence of the target object. The distance from the camera to the target object is based on a vector representing a boundary of the target object, an angle between the vector representing the boundary of the target object and a horizontal projection of a first segment of the boundary of the target object, and a position of the target object in the camera field of vision.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
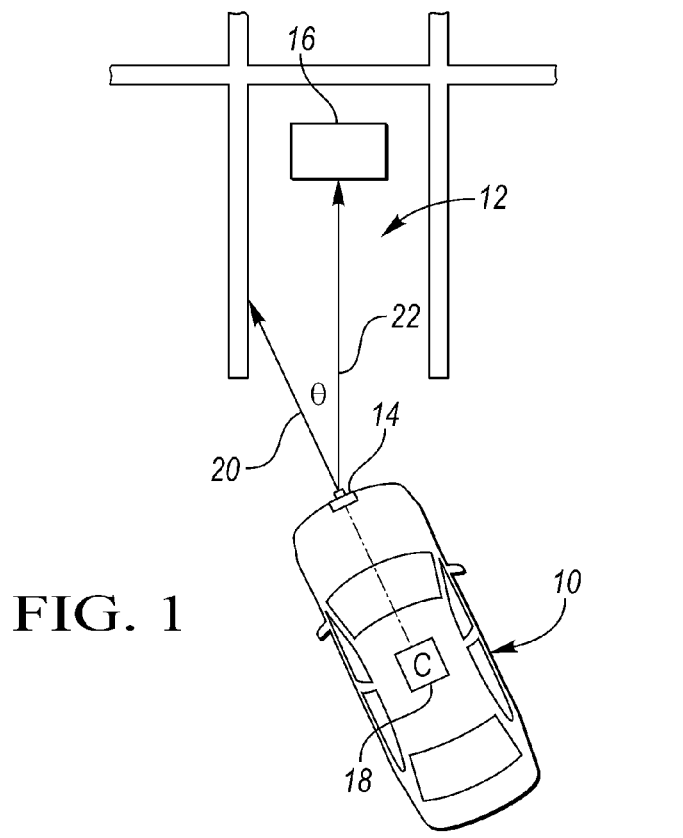
FIG. 1 is a schematic diagram illustrating an overhead view of a vehicle relative to a parking space.

Referring to FIG. 1, an overhead view of a vehicle 10 relative to a parking space 12 is illustrated. The vehicle 10 may include a camera 14 that is configured to detect a target object 16 located in the parking space 12. The camera 14 may also be configured to generate an output signal indicating the presence of the target object 16 and information relating to the presence of the target object 16. The camera 14 may be any type of camera but is preferably a digital camera. Although the camera 14 is shown to face away from the front end of the vehicle 10, it may be repositioned to face away from the back end of the vehicle 10. The camera 14 may be in communication with a controller 18 that is programmed to advance the vehicle 10 into the parking space 12 based on a yaw angle θ (which is an angle between the target object 16 and a perpendicular to the camera's field of vision) and a distance from the camera 14 to the target object 16, in response to receiving the signal from the camera 14 indicating the presence of the target object. The perpendicular to the camera's field of vision may be represented by a first vector 20 and the distance from the camera 14 to the target object 16 may be represented by a second vector 22.

While illustrated as one controller, the controller 18 may be part of a larger control system and may be controlled by various other controllers throughout the vehicle 10, such as a vehicle system controller (VSC). It should therefore be understood that the controller 18 and one or more other controllers can collectively be referred to as a "controller" that controls various functions of the vehicle 10 and/or actuators in response to signals from various sensors. Controller 18 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

Referring Now to FIGS. 2-5, a series of steps are used to extrapolate the yaw angle θ and the distance from the camera 14 to the target object 16. The steps may be carried out by a program stored in the controller 18 that includes an algorithm or a series of algorithms that are used to derive the yaw angle θ and the distance from the camera 14 to the target object 16, based upon information derived from observing the target object 16 in the camera's field of vision.

Figure 2:
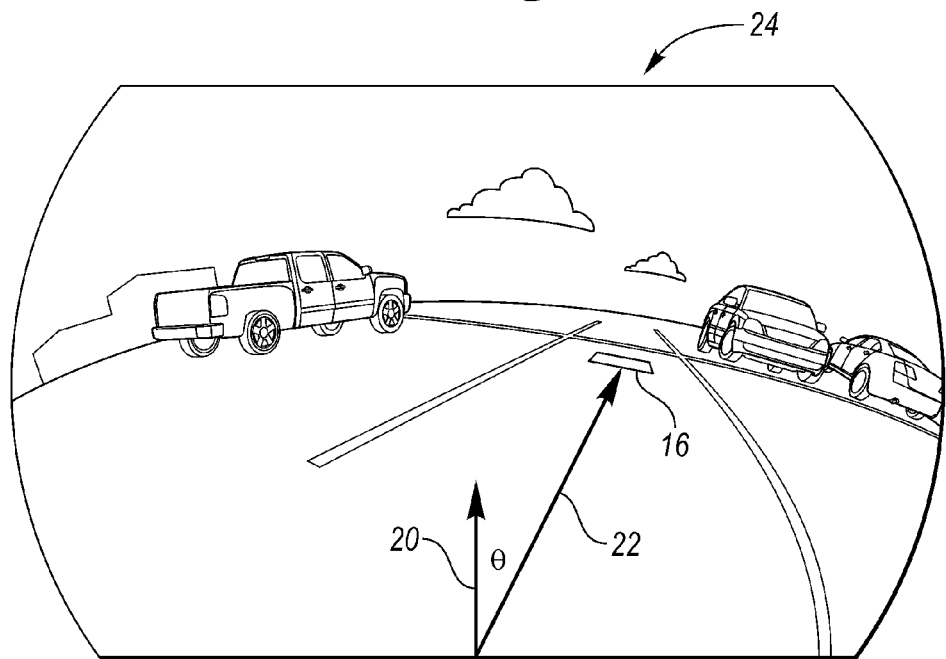
FIG. 2 illustrates a field of vision of a camera that is attached to the vehicle and a target object detected in the field of vision of the camera.

Referring to FIG. 2, the field of vision of the camera 24 is illustrated. The camera 14 first detects the target object 16. This may be accomplished using object recognition software that is configured to recognize specific objects. The object detection software that may be stored in a library in the controller 18 or other appropriate hardware that includes data storage. Next, the first vector 20, representing the perpendicular to the camera's field of vision 24, and the second vector 22, representing the distance from the camera 14 to the target object 16 based on the location of the target object 16 in the field of vision of the camera 24. At this step, however, only the directions of the first vector 20 and second vector 22 (not the magnitudes) are generated. The observable angle between the first vector 20 and second vector 22 corresponds to the yaw angle θ.

Figure 3:
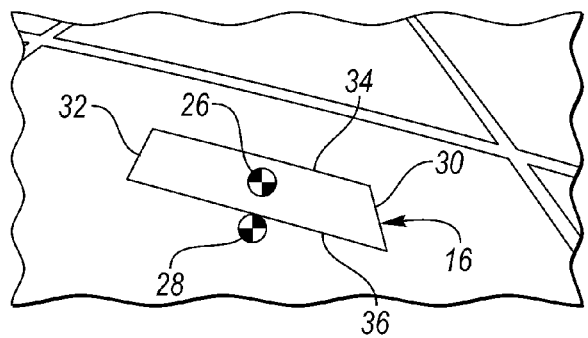
FIG. 3 illustrates a close up of the target object, in the field of vision of the camera, in relation to a camera detected centroid of the target object and an expected centroid of the target object.

Referring to FIG. 3, a close up of the target object 16 in the field of vision the camera 24 is illustrated. A detected centroid 26 and an expected centroid 28 of the target object 16 are generated. The expected centroid 28 may be generated relative to a segment of a boundary of the target object 16 based on an expected shape of the target object 16. The detected centroid 26 may be generated based on the center of the segments defining the boundary of the target object 16.

In the illustrated example, the boundary of the target object 16 includes four segments, a right side 30, a left side 32, a topside 34, and a bottom side 36. Also, in the illustrated example, the expected shape of the target object 16 is a rectangle. The expected centroid 28 is generated based on a detection of the right side 30 of the boundary of the target object 16 and the expected rectangular shape of the target object 16. The detected centroid 26 is generated based on a center of the right side 30, left side 32, topside 34, and bottom side 36 of the boundary of the target object 16. The difference in position between the expected centroid 28 and the detected centroid 26 define a distortion of the target object 16 in the field of vision of the camera 24 (the distortion of the target object 16 may also be referred to as the skew). The detected centroid 26 and the expected centroid 28 may be generated using software that detects and relates geometric patterns, shapes, configurations, etc.

Although the target object 16 is a rectangle and the right side 30 of the boundary of the target object 16 is used to generate the expected centroid 28 in the illustrated example, it should be noted that the target object 16 may be comprised of other shapes and the expected centroid 28 may be generated relative to any of the segments comprising the boundary of the target object 16.

An example of a method that may be used to quantify the distortion (skew) may include edge detection, filtering/thresholding, using a Hough transform (which may also be referred to as a Hough transformation) to calculate an angle from the perpendicular of line on an plane to the horizontal axis of the plane (hereinafter the plane will be referred to as the XY plane and the horizontal axis will be referred to as the x-axis), and comparing the angle from perpendicular of the line on the XY plane to the x-axis (that was calculated using the Hough transform) to an expected angle from the perpendicular of a segment of the target object 16 to the horizontal of the field of vision of the camera 24.

Edges of the target object 16 may be detected using edge detection software. Edge detection software is used to generate a gradient by comparing the values of neighboring pixels in the field of vision of the camera 24 of a grayscale or monochromatic image. Once the comparison of the neighboring pixels in the field of vision of the camera 24 is made, a resulting image will be generated indicating a set of differences that illustrate the detected edges, with high contrast edges being represented as larger differences.

An edge detection algorithm may be based on the following equations (1)-(3):

$$B(j, k) = \sqrt{[B_h(j,k)]^2 + [B_v(j,k)]^2} \quad (1)$$

$$B_h(j, k) = A(j, k+1) - A(j, k-1) \quad (2)$$

$$B_v(j, k) = A(j+1, k) - A(j-1, k) \quad (3)$$

A is matrix having j rows and k columns that represents a grayscale or monochromatic image.

B is a matrix representing the resulting gradient from comparing the values of neighboring pixels in the grayscale or monochromatic image.

The edge detection software may also include filtering/thresholding. For example, a threshold may be set such that only the most prominent changes of the resulting gradient, represented by the matrix B, will be shown in the resulting image that represents the edges detected in the grayscale or monochromatic image. Additionally, the matrix A may be preprocessed to show a specific color channel or region of interest in the field of vision of a camera.

A single edge that was detected, using the edge detection software, forms a series of points, along a line, on the XY plane in the field of vision of the camera 24. A Hough transform may be performed on the series of points (or pixels) formed by the detected edge. The Hough transform involves generating a series of lines through each point (or a group of selected points) formed by a single detected edge. Each line, of the series of lines drawn through each point formed by the detected edge, is related to the XY plane by a perpendicular line. Next, an angle between the perpendicular line and the x-axis, and the length of the perpendicular line from the origin to the point where the perpendicular line intersects the single edge of interest, are generated. Each point of the detected edge may then be represented in Hough space as a sinusoidal curve plotted as the angle vs. the distance of the perpendicular lines from the origin to the single edge of interest. When the sinusoidal curves are plotted, the line that passes through all the points formed by a detected edge on the XY plane, in the field of vision of the camera 24, is represented by the point in Hough space where the sinusoidal curves overlap. The point in space where the sinusoidal curves overlap gives the coordinates (length from the origin to the detected edge that forms a series of points and angle from the x-axis) of a line that is perpendicular to the detected edge that forms the series of points. The skew may then be determined by the difference in the angle at the point in Hough space where the sinusoidal curves overlap and the expected angle from the perpendicular of a segment of the target object 16 to the horizontal of the field of vision of the camera 24. Examples of the Hough transform are shown in Hough, U.S. Pat. No. 3,069,654 and Duda, R. O. and P. E. Hart, "Use of the Hough Transformation to Detect Lines and Curves in Pictures," *Communications of the ACM, Vol.* 15 *No.* 1, pp. 11-15 (January 1972), the contents of each of which is hereby incorporated by reference in its entirety.

It should be noted that other methods, other than the Hough transform, may be used to detect the skew (distortion) of the target object 16 including, but not limited to, the Fourier method, projection profile method, nearest neighbor clustering method, and the correlation method.

When determining the skew of the target object 16, the process may also take into account the internal properties of the lens that cause distortion (including radial and/or tangential distortion) of the projected image on the image plane of the camera. There are several algorithms and equations that are known in the art, that should be construed as disclosed herein, that are used to correct either barrel or pincushion type distortion of a camera lens.

Figure 4:
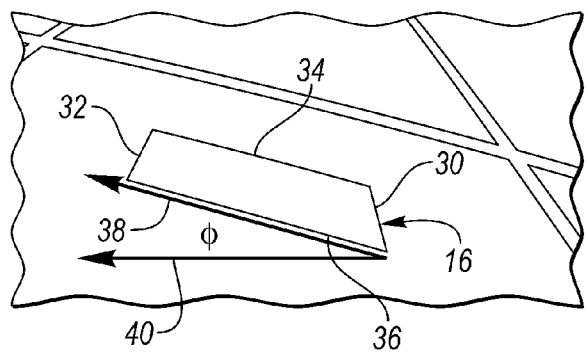
FIG. 4 illustrates a close up of the target object, in the field of vision of the camera, in relation to a vector representing an actual boundary of the target object and a vector representing a projected boundary of the target object along the x-axis.

Referring to FIG. 4, another close up of the target object 16 in the field of vision the camera 24 is illustrated. Once the skew of the target object 16 has been determined, it is possible to determine the direction and magnitude of a vector 38 that represents a segment of the boundary of the target object 16. For illustrative purposes, the vector 38 corresponds to the segment representing the bottom side 36 of the target object 16. However, it should be understood that the method may be used to determine the direction and magnitude of a vector that represents any of the segments that comprise the boundary of the target object 16 including the right side 30, left side 32, topside 34, or bottom side 36 in this example. Additionally, the method could be applied to any side of a target object that has any particular shape. Once the boundary of the target object 16 has been detected, by the edge detecting method described above, it is possible to generate a direction and magnitude of a vector 40 that is a projection of a segment of the boundary of the target object 16 along a known axis. The vector 40 that is a projection of a segment of the boundary of the target object 16 may be generated using software that detects and relates geometric patterns, shapes, configurations, etc. Here, the vector 40 corresponds to a horizontal projection of the bottom side 36 of the target object 16. Once the vector 40 representing the horizontal projection of the bottom side 36 of the target object 16 is generated, the skew (distortion), determined earlier, is applied to the vector 40 resulting in the vector 38 that corresponds to a direction and magnitude of the segment of the boundary of the target object 16 that corresponds to the bottom side 36 of the target object 16. Once the two vectors 38, 40 have been determined, and angle Φ, that is located between the two vectors 38, 40, may then be determined.

Figure 5:
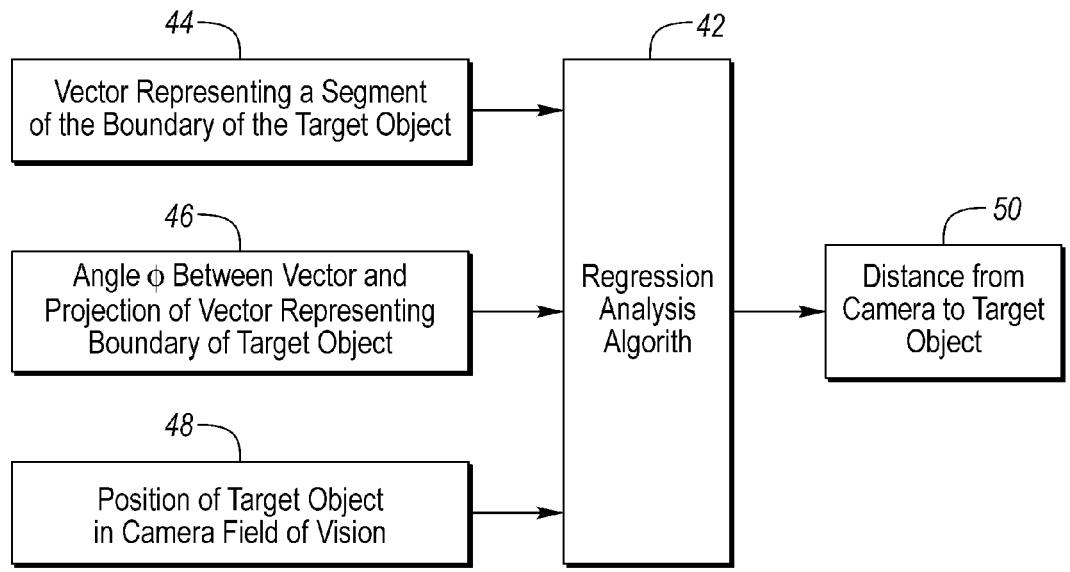
FIG. 5 illustrates a method of using regression analysis to determine the distance from the camera to the target object.

Referring to FIG. 5, a method of using regression analysis to determine the distance from the camera 14 to the target object 16 is illustrated. The method of using regression analysis includes inputting a series of variables into the regression analysis algorithm 42. The series of variables may include a first input 44 that corresponds to the vector 38 that represents the direction and magnitude of a segment of the boundary of the target object 16, a second input 46 that corresponds to the angle located between the vectors 38, 40, and a third input 48 that corresponds to the position of the target object 16 in the camera field of vision 24. The output 50 of the regression analysis algorithm 42 corresponds to a distance from the camera 14 to the target object 16. The distance from the camera 14 to the target object 16 corresponds to the magnitude of the second vector 22 depicted in FIG. 1. In conjunction with the angle θ, which is an angle between the target object 16 and the first vector 20 representing the perpendicular to the camera's field of vision, the direction and the magnitude of the second vector 22 are now known. If the camera 14 is at a known height above the road surface the Pythagorean theorem may then be applied (with the second vector 22 comprising the hypotenuse of the right triangle) to determine the distance along a road surface (which may correspond to a horizontal distance) from the camera 14 to the target object 16.

The regression analysis algorithm 42 may consist of comparing new data to previously accumulated data (which may also be referred to as training data). The training data is utilized to create a map of inputs and outputs and should be designed such that new data scales with minimal error when compared to the training data. Here, the training data and the new data may relate pixel location in the camera field of vision 24 to distance from the camera 14. Therefore, once the direction and magnitude of the vector 38 that represents a segment of the boundary of the target object 16 are determined, it is possible to determine the distance to the vector 38 (i.e., the distance from the camera 14 to the target object 16) by comparing the pixel location of the vector 38 to the previous learned data that represents pixel location and distance.

The regression analysis algorithm 42 may consist of a hypothesis function that is used to map the data points and a cost function that is used to compute the accuracy of the hypothesis function. Examples of the regression analysis algorithm 42 may include, but are not limited to, linear models, polynomial models, logistic models, and neural networks.

A linear regression analysis may be based on the following hypothesis function equation (4) and cost function equation (5):

$$H(\theta) = \theta^T x = \theta_0 + \theta_1 * x \qquad (4)$$

$$J(\theta) = \frac{1}{2 * \text{data set}} \sum_i^{\text{data set}} (H_\theta(x_i) - y_i)^2 \qquad (5)$$

A Polynomial regression analysis may be based on the following hypothesis function equation (6) and cost function equation (7):

$$H(\theta) = \theta^T x = \theta_0 + \theta_1 * x + \theta_2 * x^2 + \theta_3 * x^3 \ldots \qquad (6)$$

$$J(\theta) = \frac{1}{2 * \text{data set}} \sum_i^{\text{data set}} (H_\theta(x_i) - y_i)^2 + \lambda \sum_j^{\text{polynomical terms}} \theta_j^2 \qquad (7)$$

A Logistic regression analysis may be based on the following hypothesis function equation (8) and cost function equation (9):

$$H(\theta) = g(\theta^T x) = \frac{1}{1 + e^{-\theta^T x}} \qquad (8)$$

$$J(\theta) = \frac{1}{\text{data set}} \sum_i^{\text{data set}} y^i \log(h_\theta(x_i)) + (1 - y_i)\log(1 - h_\theta(x_i)) \qquad (9)$$

Figure 6:
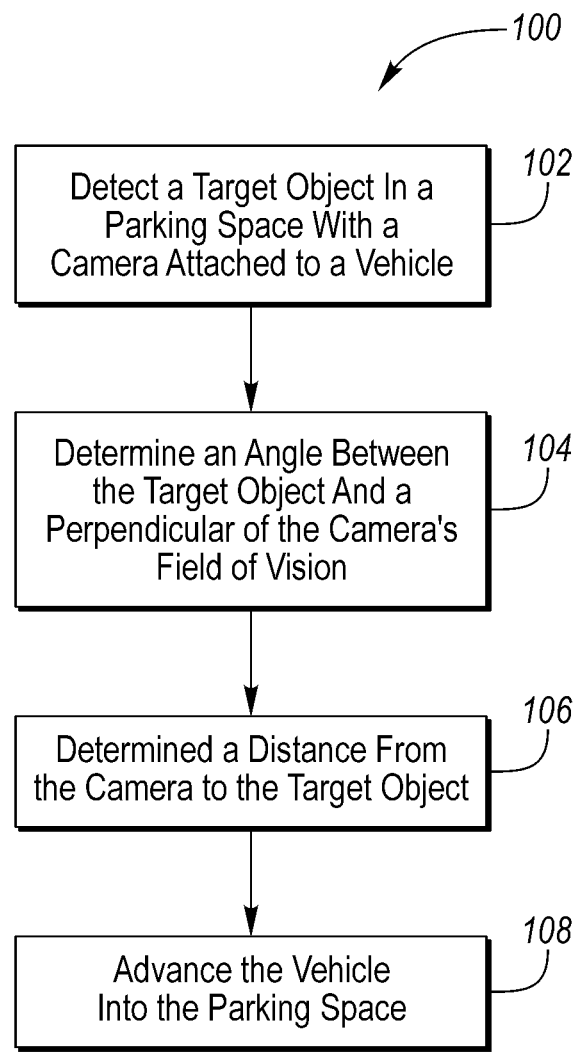
FIG. 6 illustrates a method of parking a vehicle upon detecting a target object in a parking space.

Referring to FIG. 6, a method 100 of parking a vehicle upon detecting a target object in a parking space is illustrated. The first step 102 in the method 100 includes detecting the target object 16 in the parking space 12 with the camera 14 that is attached to the vehicle 10. Once the target object 16 has been detected, the method 100 moves on to step 104 where the yaw angle θ between the perpendicular to the camera's field of vision and the target object 16 is determined. The method 100 then moves on to step 106 where a distance from the camera 14 to the target object 16 is determined, based on the method described above with respect to FIGS. 2-5. The vehicle 10 may then be advanced into the parking space 12, at step 108, based on the yaw angle θ and the distance from the camera 14 to the target object 16.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of parking a vehicle comprising:
    detecting a target object in a parking space with a camera; and
    advancing the vehicle into the parking space based on
        an angle between the target object and a perpendicular of a camera field of vision, and
        a distance from the camera to the target object based on a regression analysis that includes a vector representing a boundary segment of the target object as an input variable.

2. The method of claim 1, wherein the vector is generated based on an observed horizontal projection of the boundary segment and a distortion of the target object.

3. The method of claim 2, wherein the regression analysis also includes an angle between the vector and the horizontal projection as an input variable.

4. The method of claim 3, wherein the regression analysis also includes a position of the target object in the camera field of vision as an input variable.

5. The method of claim 3, wherein the distortion is based on a difference in position between a camera detected centroid of the target object and an expected centroid of the target object.

6. The method of claim 5, wherein the expected centroid is generated based on an observed second boundary segment of the target object.

7. The method of claim 1, wherein the distance from the camera to the target object is based on a single observation of the location the target object.

8. The method of claim 1, wherein the regression analysis determines the distance to the target object based on the pixel location of the vector in the camera field of vision.

9. A vehicle comprising:
    a camera configured to detect a target object in a parking space; and
    a controller programmed to, in response to the camera detecting the target object, advance the vehicle into the parking space based on a vehicle yaw angle and a distance to the target object, the distance being based on a regression analysis that includes a vector representing a boundary segment of the target object as an input variable.

10. The vehicle of claim 9, wherein the vector is generated based on an observed horizontal projection of the boundary segment and a distortion of the target object.

11. The vehicle of claim 10, wherein the regression analysis also includes an angle between the vector and the horizontal projection as an input variable.

12. The vehicle of claim 11, wherein the regression analysis also includes a position of the target object in a field of vision of the camera as an input variable.

13. The vehicle of claim 11, wherein the distortion is based on a difference in position between a camera detected centroid of the target object and an expected centroid of the target object.

14. The vehicle of claim 13, wherein the expected centroid is generated based on an observed second boundary segment of the target object.

15. The vehicle of claim 9, wherein the regression analysis determines the distance to the target object based on the pixel location of the vector in the camera field of vision.

16. A vehicle comprising:
    a camera configured to output a signal indicating the presence of a target object in a parking space; and
    a controller in communication with the camera and programmed to, in response to receiving the signal, advance the vehicle into the parking space based on a distance from the camera to the target object and an angle between the target object and a perpendicular of a field of vision of the camera, the distance being based on a regression analysis that includes a vector representing a boundary segment of the target object, an angle between the vector and a horizontal projection of the boundary segment, and a position of the target object in the field of vision as input variables.

17. The vehicle of claim 16, wherein the vector is generated based on the horizontal projection and a distortion of the target object.

18. The vehicle of claim 17, wherein the distortion is based on a difference in position between a camera detected centroid of the target object and an expected centroid of the target object.

19. The vehicle of claim 18, wherein the expected centroid of the target object is generated based on an observed second boundary segment of the target object.

20. The vehicle of claim 16, wherein the regression analysis determines the distance to the target object based on the pixel location of the vector in the camera field of vision.

* * * * *